United States Patent
Gotou et al.

(10) Patent No.: US 6,705,392 B2
(45) Date of Patent: Mar. 16, 2004

(54) HEAT EXCHANGER

(75) Inventors: Takaharu Gotou, Yokohama (JP); Hiroyuki Yoshida, Sano (JP)

(73) Assignees: Nissan Motor Co., Ltd., Yokohama (JP); Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/038,656

(22) Filed: Jan. 8, 2002

(65) Prior Publication Data

US 2002/0121364 A1 Sep. 5, 2002

(30) Foreign Application Priority Data

Mar. 5, 2001 (JP) .................................. 2001-060089

(51) Int. Cl.[7] .................................................. F28F 3/08
(52) U.S. Cl. .................................... 165/140; 165/166
(58) Field of Search ................. 165/140, 166, 165/167, 174

(56) References Cited

U.S. PATENT DOCUMENTS

| | | | | |
|---|---|---|---|---|
| 2,469,028 A | * | 5/1949 | Belaieff | 165/153 |
| 2,591,878 A | * | 4/1952 | Rogers et al. | 165/140 |
| 3,525,390 A | * | 8/1970 | Rothman | 165/166 |
| 3,537,513 A | * | 11/1970 | Austin et al. | 165/70 |
| 3,587,731 A | * | 6/1971 | Hays | 165/140 |
| 4,274,481 A | * | 6/1981 | Ireland et al. | 165/122 |
| RE33,026 E | * | 8/1989 | Petit et al. | 165/166 |
| 5,122,174 A | * | 6/1992 | Sunder et al. | 62/654 |
| 5,415,223 A | * | 5/1995 | Reavis et al. | 165/96 |
| 6,494,253 B2 | * | 12/2002 | Gotou et al. | 165/115 |

FOREIGN PATENT DOCUMENTS

JP        9-79694        3/1997

* cited by examiner

*Primary Examiner*—Allen Flanigan
(74) *Attorney, Agent, or Firm*—Foley & Lardner

(57) ABSTRACT

A plurality of water passages allowing flow of water, a plurality of alcohol passages allowing flow of alcohol and a plurality of high temperature gas passages heating the water passages and the alcohol passages are independently provided in a heat exchanging portion. Liquid alcohol is supplied from a first header to the alcohol passage and water is supplied from a second header to the water passage. The water passage is preferably adapted to make contact with a high temperature section of the high temperature gas passage and the alcohol passage is preferably adapted to make contact with the low temperature section of the high temperature gas passage. By separately vaporizing water and alcohol in this way, the mixing ratio of the water vapor and alcohol vapor can be controlled with high response.

9 Claims, 3 Drawing Sheets

HEAT EXCHANGER

FIELD OF THE INVENTION

This invention relates to a heat exchanger applied to a vaporizer of a fuel cell system for example.

In a fuel cell system using a reformer, alcohol and water are vaporized in a heat exchanger and supplied to a reformer in the form of gaseous mixture in order to generate hydrogen gas which is supplied to the fuel cell system.

Tokkai Hei 9-79694 published by the Japanese Patent Office in 1997 discloses a heat exchanger which vaporizes a mixture of two types of liquid. In this heat exchanger, a gaseous mixture of ammonia and water is produced from an ammoniacal solution.

BACKGROUND OF THE INVENTION

When vaporizing a mixture of two liquids with a single heat exchanger, the mixing ratio of the liquid mixture must be varied in order to vary the mixing ratio of components in the gaseous mixture. In such a heat exchanger, however, when the mixing ratio of the liquid mixture is varied, the mixing ratio of the gaseous mixture will not coincide with a target ratio until the liquid which remains inside the heat exchanger is completely vaporized. In this type of heat exchanger, response characteristics related to control of the mixing ratio are low.

Use of a plurality of heat exchangers for independently vaporizing different kinds of fluid and a mixer for mixing the different kinds of vaporized fluid may improve the response characteristics related to control of the mixing ratio. In a fuel cell system for a vehicle, however, it is difficult to obtain a space for accommodating a plurality of heat exchangers.

It is therefore an object of this invention to increase the control characteristics on the mixing ratio of a plurality of liquids when using a single heat exchanger.

In order to achieve the above object, this invention provides a heat exchanger which performs heat exchange between a high temperature fluid and a low temperature fluid. The heat exchanger comprises a heat exchanging portion comprising a first fluid passage allowing flow of a first low temperature fluid, and a second fluid passage partitioned from the first fluid passage and allowing flow of a second low temperature fluid. The heat exchanger further comprises a first supply mechanism which supplies the first low temperature fluid to the first fluid passage, and a second supply mechanism which supplies the second low temperature fluid to the second fluid passage.

This invention also provides a heat changer comprising a heat exchanging portion comprising a water passage allowing flow of water, an alcohol passage allowing flow of alcohol, and a high temperature fluid passage for heating the water passage and the alcohol passage. The high temperature fluid passage comprises a high temperature section having a contact with the water passage, and a low temperature section having a lower temperature than the high temperature section and having a contact with the alcohol passage. The heat exchanger further comprises a water supply mechanism supplying water to the water passage, and an alcohol supply mechanism supplying alcohol to the alcohol passage.

The details as well as other features and advantages of this invention are set forth in the remainder of the specification and are shown in the accompanying drawings.

DESCRIPTION OF THE PREFERRED EMBODIMENTS

Figure 1:
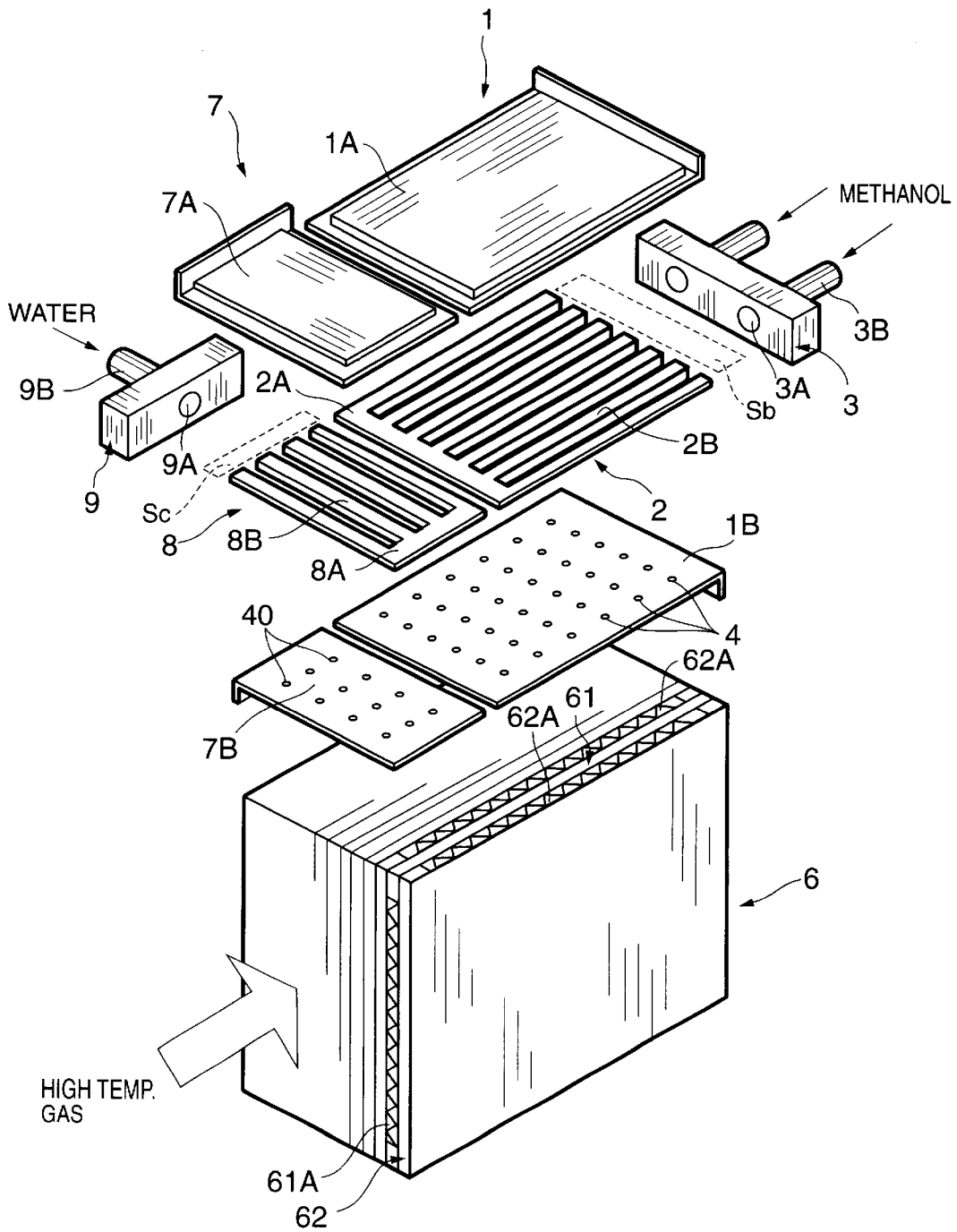
FIG. 1 is a split perspective view of a heat exchanger according to this invention.

Referring to FIG. 1 of the drawings, a heat exchanger according to this invention comprises a first header 1 and a second header 7 mounted on the top of a heat exchanging portion 6, a first fluid supply member 3 mounted on a lateral face of the first header 1 and a second fluid supply member 9 mounted on the lateral face of the second header 7. This heat exchanger is used as a vaporizer which vaporizes methanol and water in a fuel cell system by heat exchange with a high temperature gas.

The first header 1 comprises a top plate 1A, a bottom plate 1B and a comb-shaped plate 2.

Figure 2:
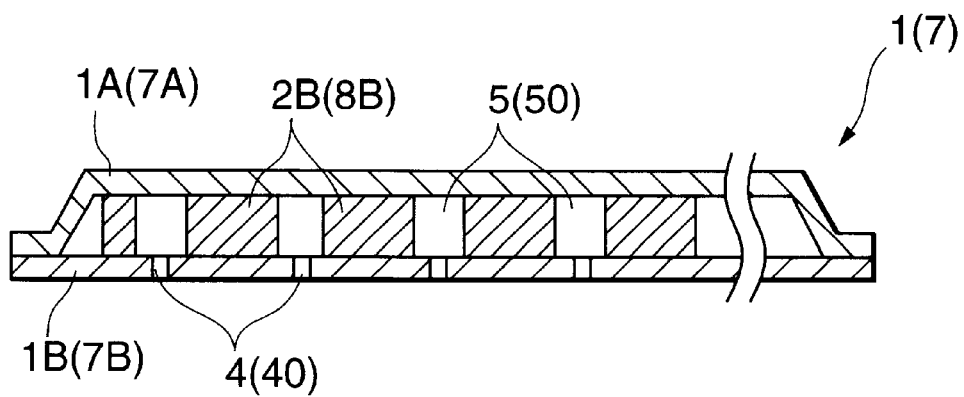
FIG. 2 is a longitudinal sectional view of a header according to this invention.

Referring to FIG. 2, the top plate 1A and the bottom plate 1B are fixed to each other by soldering or welding with the comb-shaped plate 2 vertically sandwiched therebetween.

Referring again to FIG. 1, the comb-shaped plate 2 comprises a plurality of arms 2B disposed in parallel at equal intervals and a connecting member 2A connecting an end of each arm 2B. The first fluid supply member 3 seals the opening on the lateral face of the header 1 which is positioned to face another end of each arm 2B. The length of the arms 2B is set so that a fluid distribution space Sb is formed between the first fluid supply member 3 and the end of the arms 2B. The thickness of the comb-shaped plate 2 is approximately one millimeter.

The space between adjacent arms 2B forms a conducting passage 5 which extends at right angles to the cross-section of the header 1 shown FIG. 2. The upper end of the conducting passage 5 is delimited by the top plate 1A and the bottom end is delimited by the bottom plate 1B. Each conducting passage 5 is connected to the fluid distribution space Sb. It is preferred that the width of the conducting passage 5 is set to the minimum value which satisfies a liquid methanol supply amount from the header 1 to the heat exchanging portion 6. The width of the arms 2B is determined based on this condition.

Two fluid outlets 3A which open towards the fluid distribution space Sb are formed in the first fluid supply member 3. The fluid outlets 3A are connected to a methanol supply pump via two supply pipes 3B which project from the fluid supply member 3 in an opposite direction to the fluid outlet 3A.

Through holes 4 are formed at equal intervals on the bottom plate 1B at positions facing each conducting passage 5. The second header 7 comprises a top plate 7A, a bottom plate 7B and a comb-shaped plate 8. The comb-shaped plate 8 comprises a plurality of parallel arms 8B and a connecting member 8A. The fluid supply passage 9 is provided with only a single fluid outlet 9A which is connected to a water supply pump via a connecting pipe 9B.

The basic structure of the second header 7 is the same as the first header 1. A fluid distribution space Sc is formed between the arms 8B and the second fluid supply member 9 and a conducting passage 50 is formed between adjacent arms 8B. Through holes 40 are formed on the bottom plate 7B at equal intervals at positions facing each conducting passage 50.

The first header 1 and the second header 7 are disposed adjacent to each other on the top of the heat exchanger 6. However the two headers 1 and 7 are disposed so that the direction of flow in the conducting passage 50 of the second header 7 and the direction of supply of fluid from the second fluid supply member 9 to the second header 7 are respectively orthogonal to the direction of flow in the conducting passage 5 of the first header 1 and the direction of supply of fluid from the second fluid supply member 3 to the first header 1.

The heat exchanging portion 6 is formed by alternately laminating a high temperature fluid layer 61 which allows flow of high temperature fluid and a low temperature fluid layer 62 which allows flow of a low temperature fluid in a vertical direction. These layers are laminated perpendicular to one another. The high temperature layer 61 and the low temperature layer 62 are insulated by a partition. A plurality of passages 61A which pass horizontally through the layers are formed in the high temperature layers 61. A plurality of passages 62A which pass vertically through the layers are formed in the low temperature layers 62.

Each passage 61A has an opening on a lateral face of the high temperature fluid layer 62. High temperature gas is supplied in the direction of an arrow in FIG. 1 in each passage 61A. The high temperature gas passes horizontally through each passage 61A and is discharged from the opposite end of the heat exchanging portion 6.

Each passage 62A has an opening on the top end of the low temperature fluid layer 62.

The through hole 4 in the bottom plate 1B of the first header 1 and the through hole 40 in the bottom plate 7B of the second header 7 are disposed so that both are directly above the passage 62A.

In this heat exchanger, liquid methanol is supplied to the first header 1 through the first fluid supply member 3 and water is supplied to the second header 9 through the second fluid supply member 9.

The second header 7 is disposed upstream of the first header 1 with respect to the flow of high temperature gas in the passage 61A. The boiling point of the water supplied to the second header 7 is higher than the boiling point of methanol supplied to the first header 1. In order to effectively vaporize two different kinds of liquids, a header handling liquid with a higher boiling point should therefore be disposed at a position nearer to the inlet of the passage 61A than a header handling a liquid with a lower boiling point.

In the first header 1, liquid methanol is supplied to each conducting passage 5 from the fluid distribution space Sb and drips in equal amounts from the through holes 4 to the passage 62A of the low temperature fluid layer 62. However, of the passages 62A in the low temperature fluid layer 62, liquid methanol only drips into the passages 62A positioned below the first header 1. Liquid methanol does not drip into the passages 62A positioned below the second header 7.

In the second header 7, water is supplied to each conducting passage 8B from the fluid distribution space Sc and drips from the through hole 40 down into the passage 62A of the low temperature fluid layer 62. However, of the passages 62A in the low temperature fluid layer 62, water only drips into the passages 62A positioned below the second header 7. Water does not drip into the passages 62A positioned below the first header 1.

Thus the liquid methanol and water dripping down into the low temperature fluid layer 62 do not mix and are respectively heated and vaporized by heat exchange with the high temperature gas of the high temperature fluid layer 61. The methanol vapor and water vapor are separately discharged from the lower end of the low temperature fluid layer 62. The fuel cell system may mix discharged fuel vapor and water vapor before supplying them to a reformer, or alternatively, they may separately be supplied to the reformer.

Thus water and methanol are not mixed at all in the heat exchanger and are vaporized in separate passages. Therefore when varying the mixing ratio of methanol vapor and water vapor, varying the supply amount of water or liquid methanol to the heat exchanger makes it possible to vary the mixing ratio of methanol vapor and water vapor discharged from the heat exchanger with high response characteristics.

In this embodiment, the high temperature gas corresponds to a high temperature fluid, methanol corresponds to a first low temperature fluid and water corresponds to a second low temperature fluid.

The top plate 1A corresponds to a first top plate and the top plate 7A corresponds to the second top plate. The bottom plate 1B corresponds to a first bottom plate and the bottom plate 7B corresponds to a second bottom plate. The passage 62A positioned below the first header 1 corresponds to a first fluid passage or alcohol passage and the passage 62A positioned below the second header 7 corresponds to a second fluid passage or water passage. The passage 61A corresponds to a high temperature fluid passage. The first header 1 and the first fluid supply member 3 correspond to a first supply mechanism or an alcohol supply mechanism. The second header 7 and the second fluid supply member 9 correspond to a second supply mechanism or a water supply mechanism. The holes 4 correspond to a first group of holes and the holes 40 correspond to a second group of holes. The fluid distribution space Sb corresponds to a first fluid distribution space and the fluid distribution space Sc corresponds to a second fluid distribution space. The conducting passage 5 corresponds to a first conducting passage and the conducting passage 50 corresponds to a second conducting passage.

A second embodiment of this invention will now be described with reference to FIGS. 3 and 4.

In this embodiment, a single header 21 is used instead of the first header 1 and the second header 7. A water passage and a liquid methanol passage are separately formed in the header 21.

Figure 3:
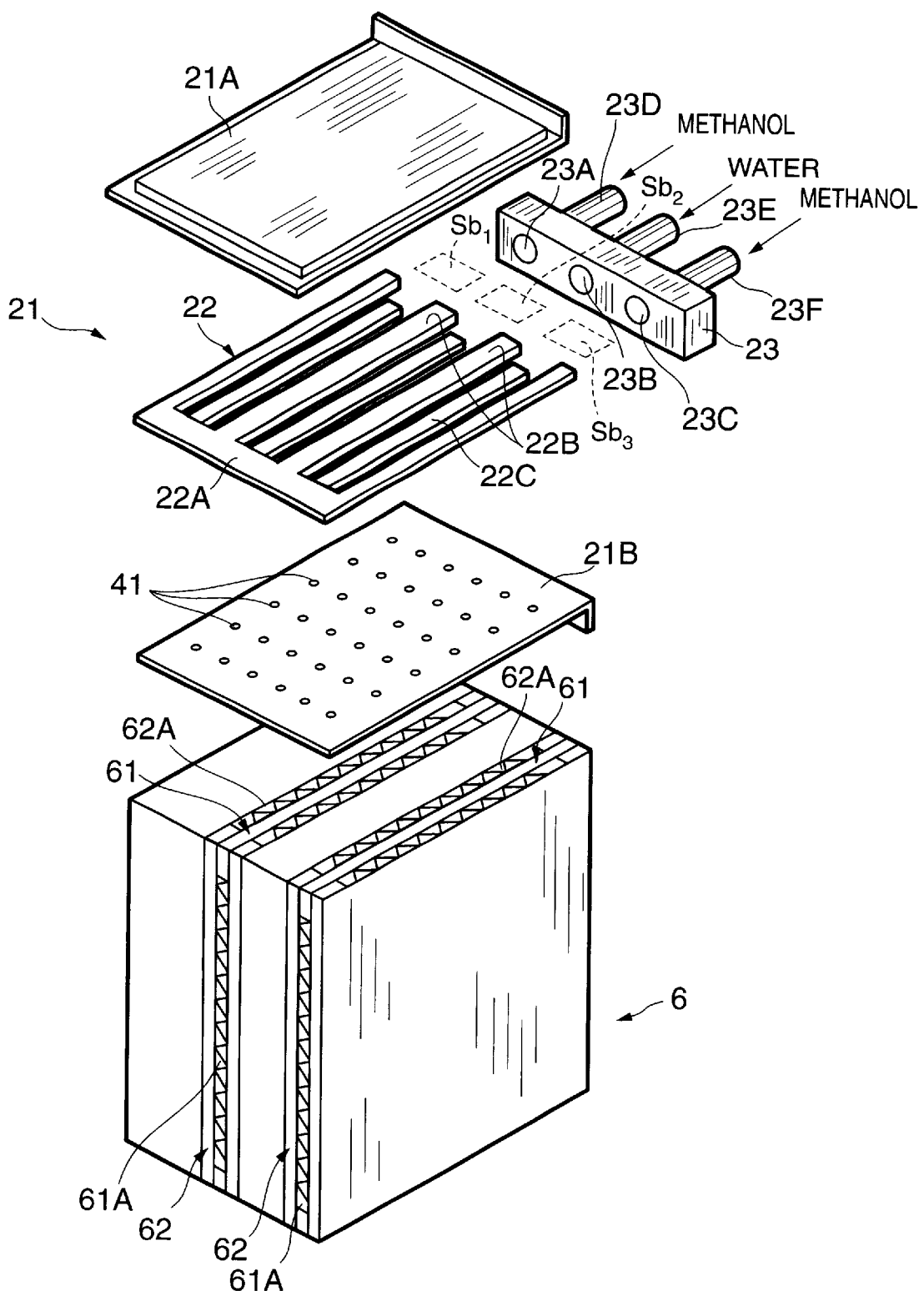
FIG. 3 is similar to FIG. 1, but showing a second embodiment of this invention.

Referring to FIG. 3, the header 21 comprises a top plate 21A, a bottom plate 21B and a comb-shaped plate 22.

The top plate 21A and the bottom plate 21B are fixed to each other by welding or soldering with the comb-shaped plate 22 vertically sandwiched therebetween.

A fluid supply member 23 is mounted on the lateral face of the header 21. Three fluid outlets 23A–23C are formed in the fluid supply member 23 and open towards the interior of the header 21. The fluid outlets 23A and 23C are disposed on both sides of the fluid outlet 23B and are respectively connected to a methanol supply pump via two connecting pipes 23D, 23F which project from the fluid supply member 23 in an opposite direction to the fluid outlets 23A, 23C. The central fluid outlet 23B is connected to a water supply pump via a supply pipe 23E which projects from the fluid supply member 23 in a direction opposite to the fluid outlet 23B.

Figure 4:
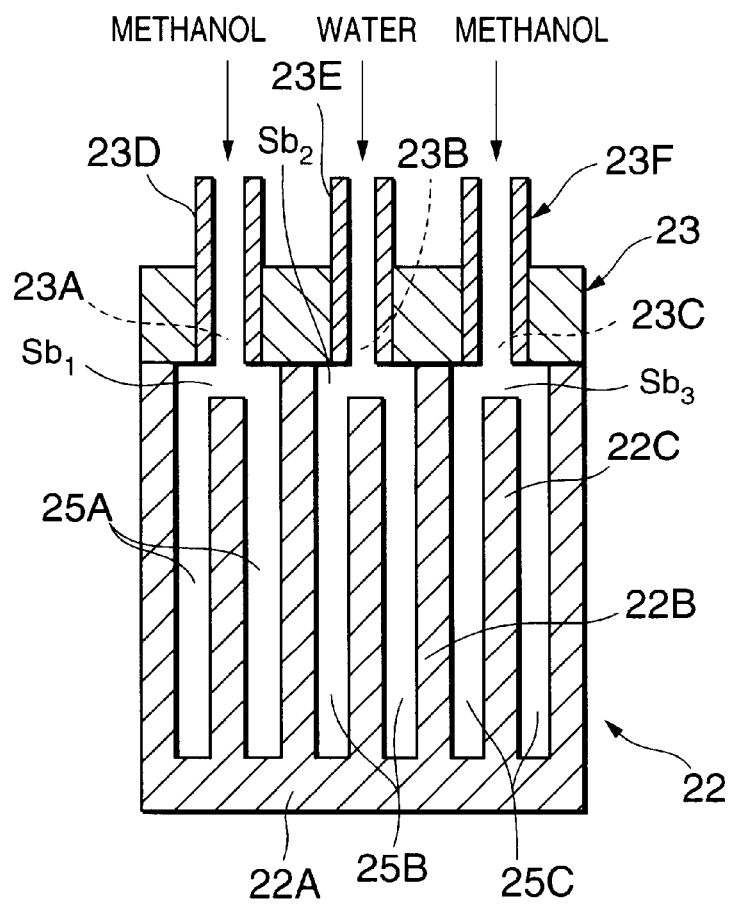
FIG. 4 is a plan view of a fluid supply member and a comb-shaped plate according to the second embodiment of this invention.

Referring to FIG. 4, the comb-shaped plate 22 is provided with a long arm 22B and a short arm 22C which are disposed alternately at equal intervals. An end of the respective arms 22B and 22C are connected to a connecting member 22A. Another end of the long arm 22B reaches the fluid supply member 23 and in this manner partitions the fluid distribution spaces Sb1–Sb3 which independently face the fluid outlets 23A–23C. A conducting passage 25A (25B, 25C) is formed between adjacent arms 22B and 22C. The conducting passages 25A are connected to the fluid distribution spaces Sb1, the conducting passages 25B are connected to the fluid distribution spaces Sb2, and the conducting passages 25C are connected to the fluid distribution spaces Sb3.

Referring again to FIG. 3, holes 41 are formed at equal intervals in the bottom plate 21B corresponding to each conducting passage 25A–25C in a manner similar to the holes 4 formed in the bottom plate 1B of the first embodiment.

The structure of the heat exchanger 6 is the same as that described with reference to the first embodiment.

In this heat exchanger, liquid methanol is only supplied to the conducting passage 25A connected to the fluid distribution space Sb1 and the conducting passage 25C which is connected to the fluid distribution space Sb2. Thus liquid methanol only drips into the passages 62A of the low temperature fluid layer 62 which are positioned below the conducting passages 25A and 25C.

On the other hand, only water is supplied to the conducting passage 25C which is connected to the fluid distribution space Sb2. Thus water only drips into the passages 62A of the low temperature fluid layer 62 which are placed below the conducting passage 25B. High temperature gas is supplied to the high temperature fluid layer 61 of the heat exchanging portion 6 in the same manner as the first embodiment. At this time, the high temperature fluid layers 61 located at the center of the heat exchanging portion 6 tend to have a higher temperature than the high temperature fluid layers 61 located near to both lateral faces of the heat exchanging portion 6.

According to this embodiment, water which has a higher boiling point drips into the high temperature fluid layers 61 located at the center of the heat exchanging portion 6. Liquid methanol which has a lower boiling point drips into the high temperature fluid layers 61 located near to both lateral faces of the heat exchanging portion 6. Thus it is possible to perform highly efficient vaporization of the liquid methanol and water in the same manner as the first embodiment. The heat exchanger according to this embodiment makes it possible to process two types of fluid separately using a single header 21. This allows the structure to be simplified and manufacturing costs to be reduced in comparison to the heat exchanger according to the first embodiment.

In each of the embodiments above, fluid is supplied from the top of the heat exchanging portion 6. However it is possible to mount a structural member equivalent to the first header 1 and the second header 7 or the header 21 on the lower face of the heat exchanging portion 6 and to discharge fluid vapor to the top of the heat exchanging portion 6. Furthermore it is possible to form the passages 61A of the high temperature fluid layer 61 vertically, to form the passages 62A of the low temperature fluid layer 62 horizontally and to mount a structural member equivalent to the header on the lateral face of the heat exchanging portion 6.

In each of the above embodiments, the fluid distribution spaces Sb, Sc, Sb1, Sb2, Sb3 and the conducting passages 5, 50, 25A–25C are partitioned by the comb-shaped plates 2, 8, 22 inside the header 1, 7, or 21.

However it is possible to partition a plurality of spaces having a waveform cross section by press forming any of the top plates 1A, 7A, 21A or the bottom plates 1B, 7B, 21B. Furthermore it is possible to assign the fluid distribution spaces Sb, Sc, Sb1, Sb2, Sb3 and the conducting passages 5, 50, 25A–25C to these spaces. In this manner, the comb-shaped plate becomes unnecessary which reduces the cost of manufacturing the header and improves the rigidity thereof.

In this embodiment, the fluid distribution spaces Sb1 and Sb2 correspond to a first fluid distribution space and the fluid distribution space Sb2 corresponds to the second fluid distribution space. The conducting passages 25A and 25C correspond to a first conducting passage and the conducting passage 25B corresponds to a second conducting passage. The fluid outlets 23A and 23C correspond to a first outlet and the fluid outlet 23B corresponds to a second outlet.

The contents of Tokugan 2001-60089 with a filing date of Mar. 5, 2001 in Japan, are hereby by reference. Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A heat exchanger which performs heat exchange between a high temperature fluid and a low temperature fluid, comprising:
    a heat exchanging portion comprising a first fluid passage allowing flow of a first low temperature fluid, a second fluid passage partitioned from the first fluid passage and allowing flow of a second low temperature fluid, and a high temperature fluid passage allowing flow of the high temperature fluid, the high temperature fluid passage being in contact with the first fluid passage to heat the first low temperature fluid and being in contact with the second fluid passage to heat the second low temperature fluid;
    a first supply mechanism which supplies the first low temperature fluid to the first fluid passage; and
    a second supply mechanism which supplies the second low temperature fluid to the second fluid passage,
    wherein a flow direction of the first fluid passage and a flow direction of the second fluid passage are each set to intersect a flow direction of the high temperature fluid passage, and the second fluid passage is disposed upstream of the first fluid passage with respect to the flow direction of the high temperature fluid.

2. The heat exchanger as defined in claim 1, wherein the first low temperature fluid is alcohol and the second low temperature fluid is water.

3. The heat exchanger as defined in claim 1, wherein the first supply mechanism comprises a first bottom plate having a first group of holes connected to the first fluid passage, a first top plate fixed to the top of the first bottom plate, a first conducting passage connected to the first group of holes and a first fluid distribution space connected to the first conducting passage being formed between the first top plate and the first bottom plate, and a member which supplies the first low temperature fluid to the first fluid distribution space, and
    wherein the second supply mechanism comprises a second bottom plate having a second group of holes connected to the second fluid passage, a second top plate fixed to the top of the second bottom plate, a second conducting passage connected to the second group of holes and a second fluid distribution space connected to the second conducting passage being formed between the second top plate and the second bottom plate, and a member which supplies the second low temperature fluid to the second fluid distribution space.

4. The heat exchanger as defined in claim 3, wherein the first supply mechanism and the second supply mechanism are disposed adjacent to each other on an upper end of the heat exchanging portion.

5. The heat exchanger as defined in claim 3, wherein the first conducting passage and the first fluid distribution space are partitioned by a comb-shaped plate which has a plurality of parallel arms sandwiched between the first top plate and the first bottom plate.

6. The heat exchanger as defined in claim 3, wherein the second conducting passage and the second fluid distribution space are partitioned by a comb-shaped plate which has a plurality of parallel arms sandwiched between the second top plate and the second bottom plate.

7. The heat exchanger as defined in claim 6, wherein a plurality of first conducting passages, a first fluid distribution space connected to the plurality of first conducting passages, a plurality of second conducting passages and a second fluid distribution space connected to the plurality of second conducting passages are partitioned between the top plate and the bottom plate, the first outlet faces the first fluid distribution space and the second outlet faces the second fluid distribution space.

8. The heat exchanger as defined in claim 7, wherein the common header further comprises a comb-shaped plate sandwiched between the top plate and the bottom plate, the comb-shaped plate comprising arms which abut with the supply member to partition the first fluid distribution space and the second fluid distribution space.

9. A heat exchanger which performs heat exchange between a high temperature fluid and a low temperature fluid, comprising:

a heat exchanging portion comprising two first fluid passages allowing flow of a first low temperature fluid, a second fluid passage partitioned from the first fluid passages and allowing flow of a second low temperature fluid, and a plurality of high temperature fluid passages allowing flow of the high temperature fluid, each of the high temperature fluid passages being in contact with at least one of the two first fluid passages and the second fluid passage to heat at least one of the first low temperature fluid and second low temperature fluid;

a first supply mechanism which supplies the first low temperature fluid to the first fluid passages; and a second supply mechanism which supplies the second low temperature fluid to the second fluid passage, wherein the two first fluid passages and the second fluid passage are disposed in parallel with each other, and the second fluid passage is disposed between the two first fluid passages with respect to a transverse direction of the high temperature fluid passages, and wherein the first supply mechanism and the second supply mechanism comprise a common header, the common header comprising a bottom plate having a plurality of through holes, a top plate fixed to the top of the bottom plate, a first conducting passage and a second conducting passage being partitioned between the top plate and the bottom plate, and a common supply member mounted on the common header, the common supply member comprising a first outlet for supplying the first low temperature fluid to the first conducting passage and a second outlet for supplying the second low temperature fluid to the second conducting passage.

* * * * *